(12) United States Patent
Murata

(10) Patent No.: US 9,909,486 B2
(45) Date of Patent: Mar. 6, 2018

(54) VEHICLE

(71) Applicant: TOYOTA JIDOSHA KABUSHIKI KAISHA, Toyota-shi, Aichi-ken (JP)

(72) Inventor: Takashi Murata, Kasugi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 255 days.

(21) Appl. No.: 14/975,812

(22) Filed: Dec. 20, 2015

(65) Prior Publication Data
US 2016/0186644 A1 Jun. 30, 2016

(30) Foreign Application Priority Data

Dec. 26, 2014 (JP) ................................. 2014-266101

(51) Int. Cl.
F01P 7/02 (2006.01)
F02B 63/04 (2006.01)
H01M 10/625 (2014.01)
H01M 10/63 (2014.01)
B60K 11/08 (2006.01)

(52) U.S. Cl.
CPC .............. F01P 7/026 (2013.01); F02B 63/04 (2013.01); H01M 10/625 (2015.04); H01M 10/63 (2015.04); B60K 11/085 (2013.01); Y02T 10/88 (2013.01)

(58) Field of Classification Search
CPC ........ B60K 11/085; B60K 11/04; F01P 7/026; B60L 11/1874
See application file for complete search history.

(56) References Cited

U.S. PATENT DOCUMENTS

| | | | | |
|---|---|---|---|---|
| 2003/0101947 A1* | 6/2003 | Ries-Mueller | ............ | F01P 7/12 123/41.05 |
| 2006/0095178 A1* | 5/2006 | Guilfoyle | ............. | B60K 11/085 701/36 |
| 2012/0049664 A1* | 3/2012 | Yokoyama | ......... | B60H 1/00392 310/53 |
| 2015/0149043 A1* | 5/2015 | Macfarlane | ............... | F01P 7/12 701/49 |
| 2015/0343894 A1* | 12/2015 | Yoshioka | ............. | B60K 11/085 180/68.1 |
| 2016/0361990 A1* | 12/2016 | Porras | .................... | B60K 11/04 |

FOREIGN PATENT DOCUMENTS

| | | |
|---|---|---|
| JP | 2011-098596 A | 5/2011 |
| JP | 2012-224215 A | 11/2012 |
| JP | 2015-145157 A | 8/2015 |
| WO | 2015/114434 A1 | 8/2015 |

* cited by examiner

Primary Examiner — Brian L Swenson
(74) Attorney, Agent, or Firm — Sughrue Mion, PLLC

(57) ABSTRACT

A vehicle includes an engine, a generator, an electric power storage device, a switch, a shutter, and a electronic control unit. The switch is configured to be operated by a user. The shutter is arranged in a path of air of intake air to the engine compartment from an outside of the vehicle. The electronic control unit configured to charge the electric power storage device by using the electric power generated by the generator when the switch is operated, and close the shutter when the electric power storage device is charged based on the operation of the switch.

7 Claims, 7 Drawing Sheets

VEHICLE

INCORPORATION BY REFERENCE

The disclosure of Japanese Patent Application No. 2014-266101 filed on Dec. 26, 2014 including the specification, drawings and abstract is incorporated herein by reference in its entirety.

BACKGROUND OF THE INVENTION

1. Field of the Invention

The present invention relates to a vehicle that is capable of traveling by using an output of an electric power storage device.

2. Description of Related Art

According to Japanese Patent Application Publication No. 2012-224215 (JP 2012-224215 A), a battery is charged and the SOC of the battery is raised (recovered) based on electric power generation by a motor using the power of an engine in the event of a battery SOC recovery command during the traveling of a hybrid vehicle. After the SOC of the battery is raised, the hybrid vehicle can travel by using an output of the battery and without using an output of the engine.

SUMMARY OF THE INVENTION

The engine is operated when the SOC of the battery is raised based on the SOC recovery command as in JP 2012-224215 A. Accordingly, the temperature of a coolant for the engine rises. When the vehicle is allowed to travel by using the output of the battery after the SOC of the battery is raised, traveling wind reaches a radiator through a front grille of the vehicle. Then, the coolant for the engine is cooled. In addition, even when the vehicle is stopped after the SOC of the battery is raised, the heat of the coolant for the engine is released from the front grille and the coolant is cooled in some cases.

The engine is started and fuel is consumed when the coolant for the engine is cooled as described above and the temperature of the coolant becomes lower than a threshold. The cooling of the coolant for the engine needs to be suppressed in order to suppress this fuel consumption.

A vehicle includes an engine, a generator, an electric power storage device, a switch, an engine compartment, a shutter, and an electronic control unit. The engine is configured to generate power for the vehicle, and the generator is configured to generate electric power by receiving an output of the engine. The electric power storage device is configured to perform charging and discharging and generate power for the vehicle. The switch is configured to be operated by a user. The engine compartment accommodates the engine, and the shutter is arranged in a path of air. The air is let into the engine compartment from an outside of the vehicle. The shutter is configured to switch between a closed state where the path of air is closed and an open state where the path of air is open. The electronic control unit configured to: i) control driving of the shutter, ii) charge the electric power storage device by using the electric power generated by the generator when the switch is operated, and iii) close the shutter when the electric power storage device is charged based on the operation of the switch.

According to the present invention, the engine is started so that the generator is allowed to generate the electric power when the electric power storage device is charged based on the operation of the switch. Then, a temperature of a coolant for the engine rises. When a state of the shutter is switched from the open state to the closed state during the charging of the electric power storage device, a reduction in the raised temperature of the coolant can be suppressed and a start of the engine that is attributable to a reduction in the temperature of the coolant can be suppressed. When the start of the engine is suppressed, the amount of fuel consumption in the engine can be reduced.

When the shutter is in the closed state, traveling wind during traveling of the vehicle can be blocked from entering the engine compartment and a reduction in the temperature of the coolant that is attributable to the traveling wind can be suppressed. When the vehicle is stationary, release of heat of the coolant warmed up by the engine to the outside of the vehicle can be suppressed and the reduction in the temperature of the coolant can be suppressed.

A vehicle includes an engine, a generator, an electric power storage device, a switch, an engine compartment, a shutter, and an electronic control unit. The engine is configured to generate power for the vehicle, and the generator is configured to generate electric power by receiving an output of the engine. The electric power storage device is configured to perform charging and discharging and generate power for the vehicle. The switch is configured to be operated by a user. The engine compartment accommodates the engine, and the shutter is arranged in a path of air. The air is let into the engine compartment from an outside of the vehicle. The shutter is configured to switch between a closed state where the path of air is closed and an open state where the path of air is open. The electronic control unit configured to: i) control driving of the shutter, ii) charge the electric power storage device by using the electric power generated by the generator when the switch is operated, and iii) close the shutter between termination of the charging of the electric power storage device resulting from the operation of the switch and satisfaction of a predetermined condition.

The engine is operated until the termination of the charging of the electric power storage device resulting from the operation of the switch, and thus the temperature of the coolant rises. Then, the temperature of the coolant rises even after the termination of the charging of the electric power storage device. Accordingly, when the shutter is controlled in the closed state between the termination of the charging of the electric power storage device and the satisfaction of the predetermined condition, a reduction in the temperature of the coolant warmed up by the engine can be suppressed.

According to the above aspect of the invention, the vehicle may include a heater configured to warm up the electric power storage device and a temperature sensor configured to detect a temperature of the electric power storage device. The electronic control unit may be configured to drive the heater when the temperature of the electric power storage device is equal to or lower than a predetermined temperature when the electric power storage device is charged based on the operation of the switch.

BRIEF DESCRIPTION OF THE DRAWINGS

Features, advantages, and technical and industrial significance of exemplary embodiments of the present invention will be described below with reference to the accompanying drawings, in which like numerals denote like elements, and wherein:

FIG. 6 is a flowchart illustrating processing according to the first embodiment pertaining to a case where an SOC recovery switch is ON;

FIG. 8 is a flowchart illustrating processing according to the second embodiment pertaining to a case where an SOC recovery switch is ON; and FIG. 9 is a flowchart illustrating the processing according to the second embodiment pertaining to the case where the SOC recovery switch is ON.

DETAILED DESCRIPTION OF EMBODIMENTS

Hereinafter, an embodiment of the present invention will be described.

Figure 1:
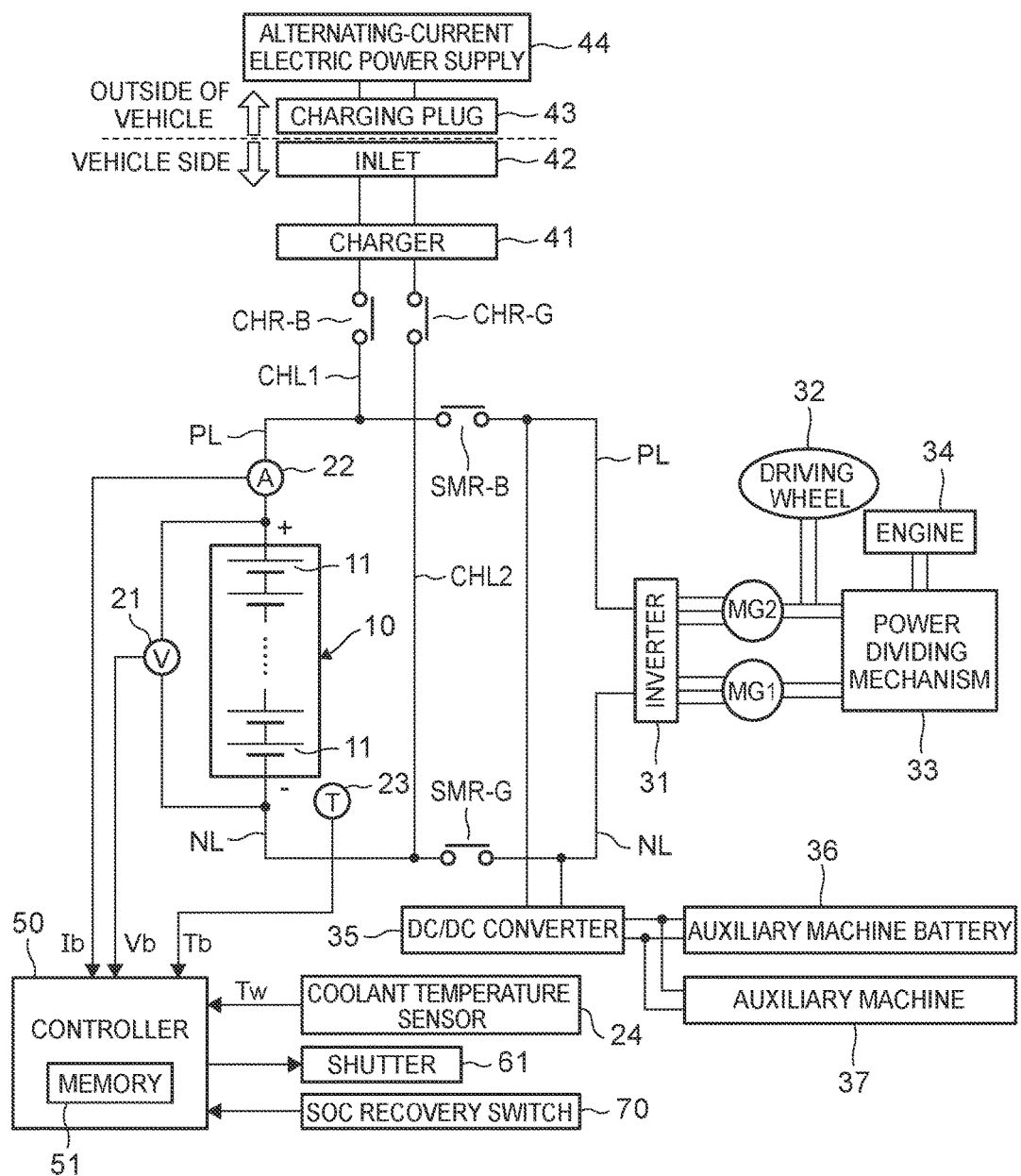
FIG. 1 is a diagram illustrating the configuration of a hybrid system according to a first embodiment.

FIG. 1 illustrates the configuration of a hybrid system according to this embodiment. The hybrid system that is illustrated in FIG. 1 is mounted in a vehicle (so-called hybrid vehicle). As described below, this vehicle is provided with a main battery (corresponding to the electric power storage device according to the present invention) and an engine as power sources for the traveling of the vehicle.

The main battery 10 has a plurality of single batteries 11 that are connected in series to each other. A secondary battery such as a nickel-hydrogen battery and a lithium-ion battery can be used as the single battery 11. In addition, an electric double layer capacitor can be used instead of the secondary battery. The main battery 10 may include a plurality of single batteries 11 that are connected in parallel to each other.

A voltage sensor 21 detects a voltage value Vb of the main battery 10 and outputs the result of the detection to an electronic control unitelectronic control unit 50. A current sensor 22 detects a current value Ib of the main battery 10 and outputs the result of the detection to the electronic control unit 50. In this embodiment, a positive value is used as the current value Ib pertaining to a case where the main battery 10 is discharged and a negative value is used as the current value Ib pertaining to a case where the main battery 10 is charged. A battery temperature sensor 23 detects the temperature of the main battery 10 (hereinafter, referred to as a battery temperature) Tb and outputs the result of the detection to the electronic control unit 50.

A coolant temperature sensor 24 detects the temperature of a coolant (hereinafter, referred to as a coolant temperature) Tw for the engine 34 (described later) and outputs the result of the detection to the electronic control unit 50. The engine 34 is started, so that the coolant is warmed up, when the engine 34 is stationary and the coolant temperature Tw is lower than a start threshold Tw_th determined in advance.

A positive electrode line PL is connected to a positive terminal of the main battery 10 and a negative electrode line NL is connected to a negative terminal of the main battery 10. The main battery 10 is connected to an inverter 31 via the positive electrode line PL and the negative electrode line NL. A system main relay SMR-B is disposed on the positive electrode line PL and a system main relay SMR-G is disposed on the negative electrode line NL.

The system main relays SMR-B, SMR-G are switched between ON and OFF in response to a driving signal from the electronic control unit 50. The electronic control unit 50 switches the system main relays SMR-B, SMR-G from OFF to ON when an ignition switch for the vehicle is switched from OFF to ON. Then, the main battery 10 and the inverter 31 can be connected to each other and the hybrid system illustrated in FIG. 1 is put into a starting state (Ready-On). When the hybrid system is in the starting state, the vehicle is allowed to travel as described below.

When the ignition switch for the vehicle is switched from ON to OFF, the electronic control unit 50 switches the system main relays SMR-B, SMR-G from ON to OFF. Then, the main battery 10 and the inverter 31 are disconnected from each other and the hybrid system illustrated in FIG. 1 is put into a stationary state (Ready-Off).

The inverter 31 converts direct-current electric power output from the main battery 10 into alternating-current electric power and outputs the alternating-current electric power to a motor generator MG2. The motor generator MG2 generates power (kinetic energy) by receiving the alternating-current electric power output from the inverter 31. The vehicle is allowed to travel by the power generated by the motor generator MG2 being transmitted to a driving wheel 32.

In addition, the motor generator MG2 converts kinetic energy generated during the braking of the vehicle into alternating-current electric power and outputs the alternating-current electric power to the inverter 31. The inverter 31 converts the alternating-current electric power from the motor generator MG2 into direct-current electric power and outputs the direct-current electric power to the main battery 10. Then, the main battery 10 can store regenerative electric power.

A power dividing mechanism 33 transmits the power of the engine 34 to the driving wheel 32 or a motor generator MG1. The motor generator MG1 performs electric power generation by receiving the power of the engine 34. Alternating-current electric power generated by the motor generator MG1 is supplied to the motor generator MG2 or the main battery 10 via the inverter 31. When the electric power that is generated by the motor generator MG1 is supplied to the motor generator MG2, the driving wheel 32 can be driven based on the power that is generated by the motor generator MG2. When the electric power that is generated by the motor generator MG1 is supplied to the main battery 10, the main battery 10 can be charged.

A boost circuit (not illustrated) can be disposed in a current path between the main battery 10 and the inverter 31. The boost circuit can boost the output voltage of the main battery 10 and output boosted electric power to the inverter 31. In addition, the boost circuit can step down the output voltage of the inverter 31 and output stepped-down electric power to the main battery 10.

A DC/DC converter 35 is connected to the positive electrode line PL between the system main relay SMR-B and the inverter 31 and the negative electrode line NL between the system main relay SMR-G and the inverter 31. The DC/DC converter 35 steps down the output voltage of the main battery 10 and outputs stepped-down electric power to an auxiliary machine battery 36 and an auxiliary machine 37. Then, the auxiliary machine battery 36 can be charged or the auxiliary machine 37 can be operated.

A charging line CHL1 is connected to the positive electrode line PL between the positive terminal of the main battery 10 and the system main relay SMR-B. A charging line CHL2 is connected to the negative electrode line NL between the negative terminal of the main battery 10 and the system main relay SMR-G. The charging lines CHL1, CHL2 are connected to a charger 41.

A charging relay CHR-B is disposed on the charging line CHL1 that connects the charger 41 and the positive electrode line PL to each other. A charging relay CHR-G is disposed on the charging line CHL2 that connects the charger 41 and the negative electrode line NL to each other. The charging relays CHR-B, CHR-G are switched between ON and OFF in response to a driving signal from the electronic control unit 50.

An inlet (so-called connector) 42 is connected to the charger 41 via the charging lines CHL1, CHL2. A charging plug (so-called connector) 43 is connected to the inlet 42. The charging plug 43 is connected to an alternating-current electric power supply 44 via a cable. The charging plug 43 and the alternating-current electric power supply 44 are arranged outside the vehicle. A commercial electric power supply or the like can be used as the alternating-current electric power supply 44.

When the charging plug 43 is connected to the inlet 42 and the charging relays CHR-B, CHR-G are ON, the main battery 10 can be charged by electric power from the alternating-current electric power supply 44 being supplied to the main battery 10. This charging is referred to as external charging. The charger 41 converts the alternating-current electric power that is supplied from the alternating-current electric power supply 44 into direct-current electric power and outputs the direct-current electric power to the main battery 10. The charger 41 can boost the output voltage of the alternating-current electric power supply 44 and output boosted electric power to the main battery 10. The electronic control unit 50 controls an operation of the charger 41.

The system that performs the external charging is not limited to the configuration illustrated in FIG. 1 insofar as the main battery 10 can by charged by the use of an electric power supply arranged outside the vehicle (external electric power supply). For example, a direct-current electric power supply can be used with or instead of the alternating-current electric power supply 44 as the external electric power supply. In addition, a system that supplies electric power without using a cable (so-called non-contact charging system) can be used. A known configuration can be appropriately adopted as the non-contact charging system.

The charging line CHL1 can be connected to the positive electrode line PL between the system main relay SMR-B and the inverter 31 and the charging line CHL2 can be connected to the negative electrode line NL between the system main relay SMR-G and the inverter 31. In this case, the charging relays CHR-B, CHR-G and the system main relays SMR-B, SMR-G are ON when the external charging is performed.

The electronic control unit 50 has a memory 51. The memory 51 stores predetermined information. The memory 51 is built into the electronic control unit 50. The memory 51 can be disposed outside the electronic control unit 50.

Figure 2:
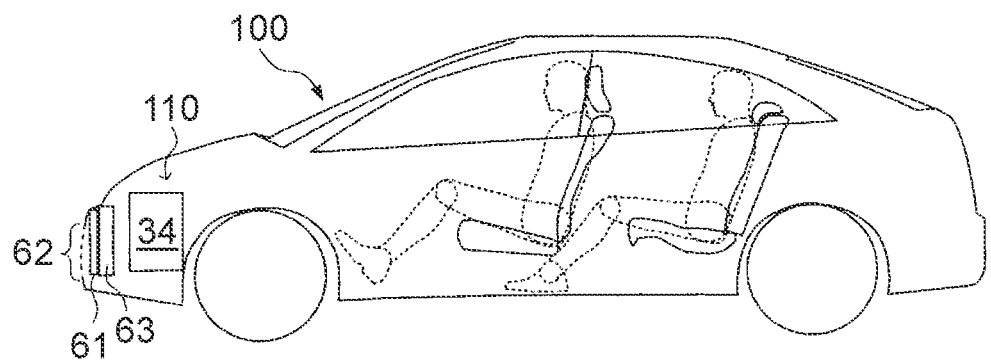
FIG. 2 is a diagram showing a position where a shutter is arranged.

A shutter 61 is operated in response to a driving signal from the electronic control unit 50. Specifically, the shutter 61 is operated in a closed state or in an open state. As illustrated in FIG. 2, a front grille 62 is disposed in the front of the vehicle 100. The front grille 62 is used to let air ahead of the vehicle 100 into an engine compartment 110. The engine 34 and a radiator 63 are accommodated in the engine compartment 110. The shutter 61 is arranged between the radiator 63 and the front grille 62. The coolant for the engine 34 flows to the radiator 63.

An SOC recovery switch 70 in FIG. 1 is operated by a user (such as a driver) when the state of charge (SOC) of the main battery 10 is raised. An operation signal (ON/OFF) of the SOC recovery switch 70 is input to the electronic control unit 50. When the SOC of the main battery 10 is raised with the SOC recovery switch 70 ON, the electronic control unit 50 allows the motor generator MG1 to perform electric power generation by using the engine 34. Then, electric power is supplied from the motor generator MG1 to the main battery 10 and the SOC of the main battery 10 is raised. In this case, the coolant is warmed up by the heat that is generated by the engine 34 and the coolant temperature Tw rises because the engine 34 is in operation.

The above-described processing for raising (recovering) the SOC of the main battery 10 with the SOC recovery switch 70 ON is referred to as SOC recovery processing. The SOC recovery processing is performed when the hybrid system illustrated in FIG. 1 is in the starting state. For example, the SOC recovery processing can be performed when the vehicle is stationary or the vehicle is in a traveling state with the hybrid system being in the starting state.

When the SOC recovery processing is performed with the vehicle being stationary, for example, the charging current of the main battery 10 can be a constant current. When the SOC recovery processing is performed during the traveling of the vehicle, the vehicle can travel with some of the power of the engine 34 transmitted to the driving wheel 32 while the rest of the power of the engine 34 can be used for the charging of the main battery 10. In this case, the charging current of the main battery 10 pertaining to a case where the SOC recovery processing is performed might be changed depending on the traveling state of the vehicle.

The SOC recovery processing can be terminated when the SOC of the main battery 10 is equal to or higher than a target value SOC_tag. The target value SOC_tag can be set in advance and information relating to the target value SOC_tag is stored in the memory 51. The target value SOC_tag can be changed by the user or the like.

Figure 3:
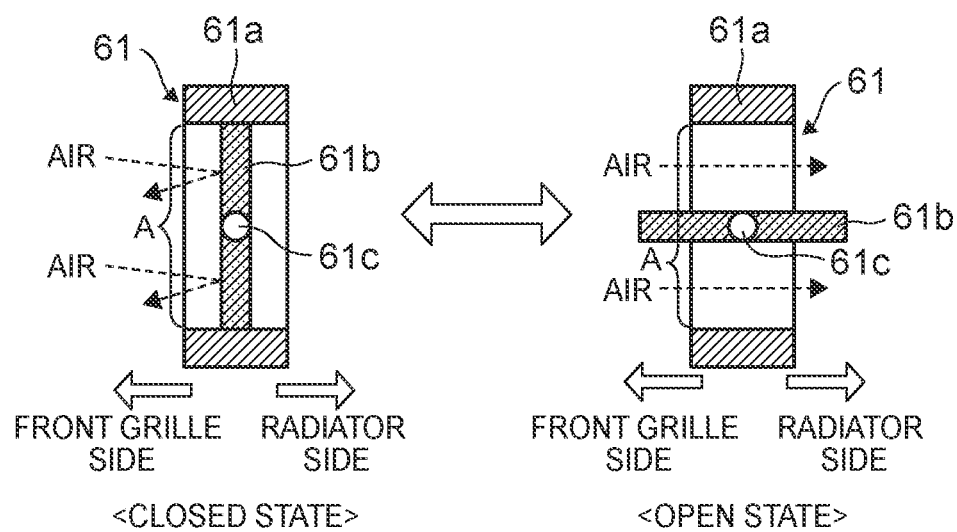
FIG. 3 is a schematic diagram illustrating the structure of the shutter.

FIG. 3 is a schematic diagram illustrating the structure of the shutter 61. The shutter 61 has a frame body 61a, a shielding plate 61b, and a rotary shaft 61c. The rotary shaft 61c is connected to a motor (a part of the auxiliary machine 37) and rotates in response to power from the motor. The electronic control unit 50 drives the motor. The auxiliary machine battery 36 can be used as an electric power supply for the motor. The shielding plate 61b is fixed to the rotary shaft 61c, and thus the shielding plate 61b rotates in response to the rotation of the rotary shaft 61c.

When the shutter 61 is in the closed state, the shielding plate 61b blocks an opening portion A that is formed by the frame body 61a as illustrated in FIG. 3. Then, the air that passes through the front grille 62 is blocked from moving to the engine compartment 110 (radiator 63 and engine 34) by the shielding plate 61b during the traveling of the vehicle 100.

When the shutter 61 is in the open state, the shielding plate 61b does not block the opening portion A. Accordingly, the air that passes through the front grille 62 is led to the engine compartment 110 (radiator 63 and engine 34) through the shutter 61 during the traveling of the vehicle 100. As described above, the amount of the air that is led to the engine compartment 110 from the front grille 62 can be changed based on the switching of the shutter 61 between the closed state and the open state.

In the vehicle 100 according to this embodiment, a charge depleting (CD) mode and a charge sustain (CS) mode are set as traveling modes. In the CD mode, traveling using only an output of the main battery 10, that is, traveling using only the power of the motor generator MG2 is preferentially performed. In the CS mode, traveling in which outputs of the main battery 10 and the engine 34 are used at the same time is preferentially performed.

In the CD mode and the CS mode, a state where the traveling is performed by the use of only the power of the motor generator MG2 (output of the main battery 10) and a state where the traveling is performed by the use of the power of the engine 34 and the power of the motor generator MG2 (output of the main battery 10) are present. An output required for starting the engine 34 (hereinafter, referred to as an engine start output) in the CD mode differs from the engine start output in the CS mode. Specifically, the engine start output in the CD mode exceeds the engine start output in the CS mode. The engine start outputs in the CD mode and the CS mode can be set in advance. The engine start output is defined by the rotational speed and torque of the engine 34.

In a case where the CD mode is set as the traveling mode and an output required for the vehicle 100 due to an accelerator pedal operation or the like is less than the engine start output in the CD mode, the traveling of the vehicle 100 (traveling in the CD mode) is performed by the use of only the power of the motor generator MG2 in the state where the engine 34 is stationary. When the output required for the vehicle 100 is equal to or higher than the engine start output in the CD mode, the traveling of the vehicle 100 (traveling in the CD mode) is performed by the use of the power of the engine 34 and the power of the motor generator MG2.

The output required for the vehicle 100 becomes equal to or higher than the engine start output in the CD mode in a certain traveling state such as wide open throttle (WOT). Accordingly, the traveling using only the power of the motor generator MG2 is preferentially performed in the CD mode.

In a case where the CS mode is set as the traveling mode and the output required for the vehicle 100 is lower than the engine start output in the CS mode, the traveling of the vehicle 100 using only the power of the motor generator MG2 (traveling in the CS mode) is performed in the state where the engine 34 is stationary. When the output required for the vehicle 100 is equal to or higher than the engine start output in the CS mode, the traveling of the vehicle 100 (traveling in the CS mode) is performed by the use of the power of the engine 34 and the power of the motor generator MG2.

The output required for the vehicle 100 is lower than the engine start output in the CS mode only in a certain operation state such as an idling operation. Accordingly, the traveling using the power of the engine 34 and the power of the motor generator MG2 is preferentially performed in the CS mode.

Figure 4:
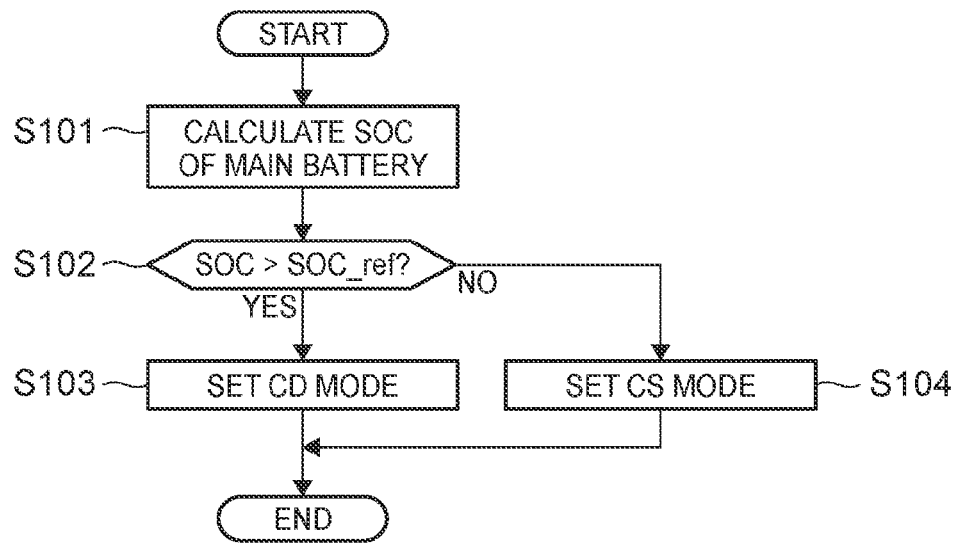
FIG. 4 is a flowchart illustrating processing for setting a CD mode and a CS mode.

FIG. 4 illustrates processing for setting the CD mode and the CS mode.

In Step S101, the electronic control unit 50 calculates the SOC of the main battery 10. A known method can be adopted as a method for calculating the SOC. Herein, the SOC of the main battery 10 can be calculated based on the voltage value Vb and the current value Ib of the main battery 10.

In Step S102, the electronic control unit 50 determines whether or not the SOC that is calculated in the processing of Step S101 is higher than a reference value SOC_ref. The reference value SOC_ref, which is set in advance, is an SOC that is lower than the target value SOC_tag described above. Information relating to the reference value SOC_ref is stored in the memory 51.

When it is determined in Step S102 that the SOC of the main battery 10 is higher than the reference value SOC_ref, the electronic control unit 50 sets the CD mode in Step S103. When the SOC of the main battery 10 is equal to or lower than the reference value SOC_ref, the electronic control unit 50 sets the CS mode in Step S104. When the SOC recovery processing is performed, the SOC of the main battery 10 is higher than the reference value SOC_ref, and thus the traveling in the CD mode can be performed after the termination of the SOC recovery processing.

Figure 5:
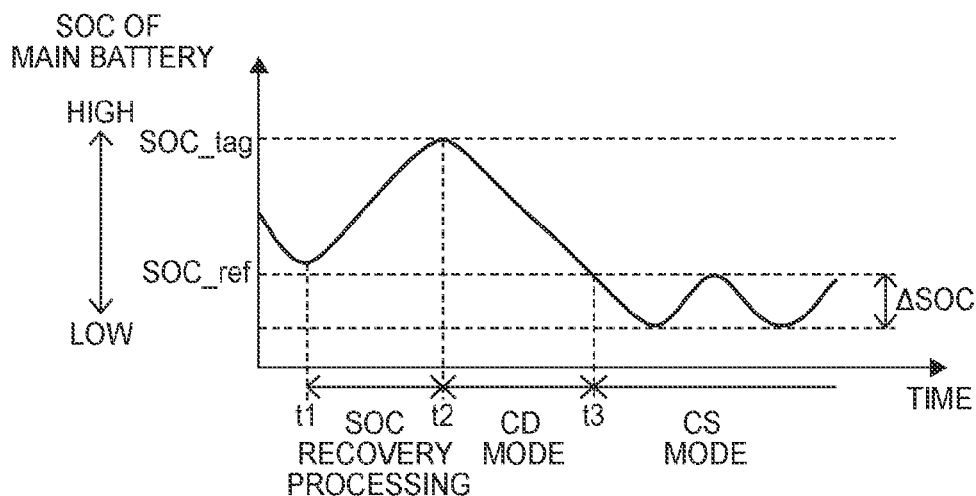
FIG. 5 is a diagram showing an SOC change in a main battery.

FIG. 5 illustrates (an example of) a behavior of the SOC of the main battery 10. In FIG. 5, the vertical axis represents the SOC of the main battery 10 and the horizontal axis represents time.

In FIG. 5, the SOC recovery processing is initiated with the SOC recovery switch 70 ON at time t1. In FIG. 5, the SOC recovery processing is initiated when the SOC of the main battery 10 is higher than the reference value SOC_ref. However, the SOC recovery processing might be initiated when the SOC of the main battery 10 is equal to or lower than the reference value SOC_ref. The reference value SOC_ref is a predetermined state of charge.

The SOC of the main battery 10 rises after time t1, and the SOC of the main battery 10 reaches the target value SOC_tag at time t2. Then, the SOC recovery processing is terminated. The SOC of the main battery 10 at time t2 is higher than the reference value SOC_ref. Accordingly, the CD mode is set, and the vehicle 100 can travel in the CD mode. When the vehicle 100 is allowed to travel in the CD mode after time t2, the SOC of the main battery 10 is reduced. Then, at time t3, the SOC of the main battery 10 reaches the reference value SOC_ref.

The CS mode is set at time t3. The vehicle 100 is allowed to travel in the CS mode after time t3. In the CS mode, the main battery 10 and the engine 34 are used at the same time, and thus the charging and discharging of the main battery 10 is controlled so that the SOC of the main battery 10 changes within a predetermined range ΔSOC which is equal to or lower than the reference value SOC_ref. The predetermined range ΔSOC is defined by an upper limit SOC and a lower limit SOC. The upper limit SOC can be the reference value SOC_ref as illustrated in FIG. 5.

When the SOC of the main battery 10 is the upper limit SOC, the discharging of the main battery 10 is actively performed and the SOC of the main battery 10 is reduced. In addition, when the SOC of the main battery 10 is the lower limit SOC, the charging of the main battery 10 is actively performed and the SOC of the main battery 10 is raised. The regenerative electric power and the electric power that is available when the motor generator MG1 is allowed to perform electric power generation by the use of the power of the engine 34 are used when the SOC of the main battery 10 is raised. Then, the SOC of the main battery 10 can be changed within the predetermined range ΔSOC.

Figure 6:
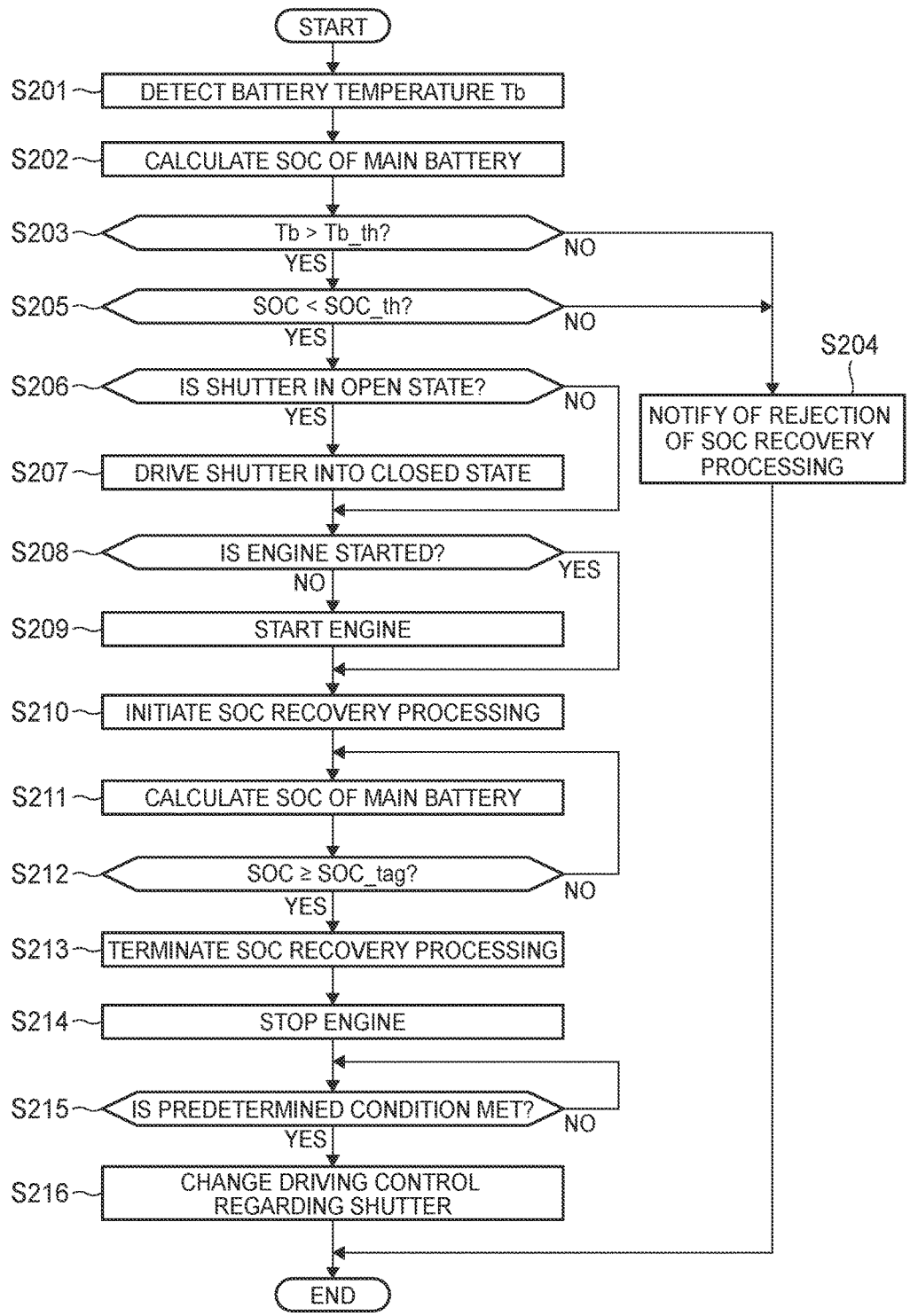

Hereinafter, processing pertaining to a case where the SOC recovery switch 70 is ON will be described based on the flowchart that is illustrated in FIG. 6. The SOC recovery switch 70 is turned ON when the vehicle 100 travels or when the vehicle 100 is stationary.

In Step S201, the electronic control unit 50 detects the battery temperature Tb by using the battery temperature sensor 23. In Step S202, the electronic control unit 50 calculates the SOC of the main battery 10. In Step S203, the electronic control unit 50 determines whether or not the battery temperature Tb that is detected in the processing of Step S201 is higher than a predetermined temperature Tb_th. The predetermined temperature Tb_th is set in advance in view of the input and output performances of the main battery 10 as described below.

When the battery temperature Tb is higher than the predetermined temperature Tb_th, the electronic control unit 50 performs the processing of Step S205. When the battery temperature Tb is equal to or lower than the predetermined temperature Tb_th, the electronic control unit 50 notifies the user of a rejection of the SOC recovery processing in Step S204. The user notification can be performed by the generation of a predetermined sound or by the display of predetermined information on a display mounted in the vehicle 100. After the processing of Step S204 is performed, the electronic control unit 50 terminates the processing that is illustrated in FIG. 6.

A reason for the rejection of the SOC recovery processing will be described. As described above, the traveling in the CD mode is performed after the termination of the SOC recovery processing. Accordingly, in many cases, the user turns ON the SOC recovery switch 70 so as to perform the traveling in the CD mode.

During the traveling in the CD mode, the traveling using only the output of the main battery 10 is preferentially performed. However, the required output of the vehicle 100 is unlikely to be met with the output of the main battery 10 alone when the output performance of the main battery 10 is reduced. In other words, the traveling using only the output of the main battery 10 is unlikely to be performed despite the SOC recovery processing when the output performance of the main battery 10 is reduced. Accordingly, the SOC recovery processing is rejected when the output performance of the main battery 10 is reduced.

The input and output performances of the main battery 10 depend on the battery temperature Tb. The input and output performances of the main battery 10 are reduced as the battery temperature Tb decreases. Accordingly, the predetermined temperature Tb_th is set, and the SOC recovery processing is rejected when the battery temperature Tb is equal to or lower than the predetermined temperature Tb_th.

In Step S205, the electronic control unit 50 determines whether or not the SOC that is calculated in the processing of Step S202 is lower than a threshold SOC_th. The threshold SOC_th is a threshold for a determination as to whether or not the SOC recovery processing needs to be performed. The threshold SOC_th is equal to or lower than the target value SOC_tag and is higher than the reference value SOC_ref. When the traveling in the CD mode can continue, the SOC of the main battery 10 does not have to be raised by the SOC recovery processing. The threshold SOC_th can be appropriately set in view thereof.

When the SOC of the main battery 10 is equal to or higher than the threshold SOC_th, the electronic control unit 50 determines that the SOC recovery processing does not have to be performed and performs the processing of Step S204. When the SOC of the main battery 10 is lower than the threshold SOC_th, the electronic control unit 50 determines in Step S206 whether or not the shutter 61 is in the open state. When the shutter 61 is in the open state, the electronic control unit 50 drives the shutter 61 into the closed state in Step S207. When the shutter 61 is in the closed state, the electronic control unit 50 performs the processing of Step S208.

In Step S208, the electronic control unit 50 determines whether or not the engine 34 is started. When the engine 34 is started, the electronic control unit 50 proceeds to the processing of Step S210. When the engine 34 is not started, the electronic control unit 50 starts the engine 34 in Step S209. In Step S210, the electronic control unit 50 initiates the SOC recovery processing.

In Step S211, the electronic control unit 50 calculates the SOC of the main battery 10. In Step S212, the electronic control unit 50 determines whether or not the SOC that is calculated in the processing of Step S211 is equal to or higher than the target value SOC_tag. When the SOC of the main battery 10 is lower than the target value SOC_tag, the electronic control unit 50 returns to the processing of Step S211. Herein, the SOC recovery processing is initiated and the SOC of the main battery 10 continues to rise. Accordingly, the processing of Step S211 is repeated until the SOC of the main battery 10 becomes equal to or higher than the target value SOC_tag.

When the SOC of the main battery 10 becomes equal to or higher than the target value SOC_tag, the electronic control unit 50 terminates the SOC recovery processing in Step S213. Specifically, the electronic control unit 50 stops the electric power generation by the motor generator MG1 that uses the power of the engine 34. In Step S214, the electronic control unit 50 stops the engine 34. Herein, the traveling in the CD mode is performed after the engine 34 is stopped during the traveling of the vehicle 100.

In Step S215, the electronic control unit 50 determines whether or not a predetermined condition is met. The predetermined condition is a condition for changing driving control regarding the shutter 61. In other words, the predetermined condition is a condition for maintaining the shutter 61 in the closed state. Details of the predetermined condition will be described later. The electronic control unit 50 stands by until the predetermined condition is met. In Step S216, after the predetermined condition is met, the electronic control unit 50 changes the driving control regarding the shutter 61.

In the processing of Step S216, switching is performed from the control for maintaining the shutter 61 in the closed state to the driving control regarding the shutter 61 for ensuring the traveling stability of the vehicle 100. During the driving control regarding the shutter 61 for ensuring the traveling stability, the driving of the shutter 61 is controlled for the lift and down force generation as is known. After the driving control regarding the shutter 61 is changed, the state of the shutter 61 might be switched from the closed state to the open state or the shutter 61 might be maintained in the closed state.

According to this embodiment, the state of the shutter 61 is switched from the open state to the closed state when the SOC recovery processing is performed. Accordingly, a reduction in the coolant temperature Tw, which rises during the SOC recovery processing, can be suppressed and the start of the engine 34 that is attributable to the coolant temperature Tw becoming lower than the start threshold Tw_th can be suppressed. The amount of the fuel that is consumed by the engine 34 can be reduced when the start of the engine 34 is suppressed.

The engine 34 is operated when the SOC recovery processing is performed. Accordingly, the coolant is warmed up. In this embodiment, the warmed-up coolant is unlikely to be cooled since the shutter 61 is driven in the closed state. Accordingly, a reduction in the coolant temperature Tw can be suppressed.

In a case where the SOC recovery processing is performed during the traveling of the vehicle 100 with the shutter 61 being in the closed state, for example, traveling wind can be blocked from reaching the radiator 63 and the cooling of the coolant that is attributable to the traveling wind can be suppressed. In addition, in a case where the SOC recovery processing is performed while the vehicle 100 is stationary with the shutter 61 being in the closed state, the release of the heat of the coolant for the engine 34 to the outside the vehicle 100 through the shutter 61 and the front grille 62 can be suppressed.

Hereinafter, an example of the predetermined condition regarding the processing of Step S215 in Step S6 will be described.

Examples of the predetermined condition can include ON-to-OFF switching of the ignition switch. In this case, the hybrid system is put into the stationary state, and thus the shutter 61 can be maintained in the closed state. In this case, the shutter 61 is in the closed state when the traveling is performed in the CD mode after the SOC recovery processing. Then, air resistance during the traveling of the vehicle 100 can be reduced and the CD mode can be given an extended traveling distance.

Examples of the predetermined condition can also include OFF-to-ON switching of the ignition switch, that is, the ignition switch being turned back ON with the state of the hybrid system switched from the starting state to the stationary state. In this case, the shutter 61 remains in the closed state when the hybrid system is put into the stationary state. Then, the ignition switch is turned back ON and the driving control regarding the shutter 61 for ensuring the traveling stability is initiated when the hybrid system is put into the starting state.

Examples of the predetermined condition can also include the coolant temperature Tw being lower than the start threshold Tw_th. In this embodiment, the start of the engine 34 is suppressed with the shutter 61 being in the closed state as described above. However, the engine 34 is started when the coolant temperature Tw becomes lower than the start threshold Tw_th due to an effect of the temperature in the atmosphere. In this case, the shutter 61 does not have to be maintained in the closed state for the suppression of the start of the engine 34. Accordingly, the coolant temperature Tw being lower than the start threshold Tw_th can be an example of the predetermined condition.

Examples of the predetermined condition can also include the traveling mode of the vehicle 100 being switched from the CD mode to the CS mode. In the CS mode, the traveling is performed with the output of the main battery 10 and the output of the engine 34 used at the same time, and thus the engine 34 becomes likely to be started. When the engine 34 is started, the shutter 61 does not have to be maintained in the closed state for the suppression of the start of the engine 34. Accordingly, the traveling mode of the vehicle 100 being switched from the CD mode to the CS mode can be an example of the predetermined condition.

One of the processing of Step S203 and Step S205 in FIG. 6 may not be performed. The processing of Step S202 is omitted when only the processing of Step S203 is performed and the processing of Step S201 is omitted when only the processing of Step S205 is performed. The processing of Step S201 to S205 can be omitted as well. In other words, the processing that follows Step S206 can be performed when the SOC recovery switch 70 is ON.

In this embodiment, the state of the shutter 61 is switched from the open state to the closed state when the SOC recovery processing is initiated. However, the present invention is not limited thereto.

Specifically, the state of the shutter 61 can be switched from the open state to the closed state between the initiation of the SOC recovery processing and the termination of the SOC recovery processing. In this case, the processing of Step S206 and Step S207 may be performed between the processing of Step S210 and the processing of Step S213. Even in this case, a reduction in the coolant temperature Tw can be suppressed based on the driving of the shutter 61 in the closed state.

The state of the shutter 61 can also be switched from the open state to the closed state between the termination of the SOC recovery processing and the satisfaction of the predetermined condition described with regard to the processing of Step S215. In this case, the processing of Step S206 and Step S207 may be performed between the processing of Step S213 and the processing of Step S216. The prediction of a timing when the predetermined condition is met is difficult depending on details of the predetermined condition. In this case, the state of the shutter 61 may be switched from the open state to the closed state when the SOC recovery processing is terminated.

When the SOC recovery processing is performed, the coolant temperature Tw can be raised. Accordingly, the coolant temperature Tw rises even after the termination of the SOC recovery processing. Accordingly, a reduction in the coolant temperature Tw can be suppressed even in the event of the driving of the shutter 61 in the closed state after the termination of the SOC recovery processing.

Hereinafter, a second embodiment according to the present invention will be described. The following description will focus on how the second embodiment differs from the first embodiment.

Figure 7:
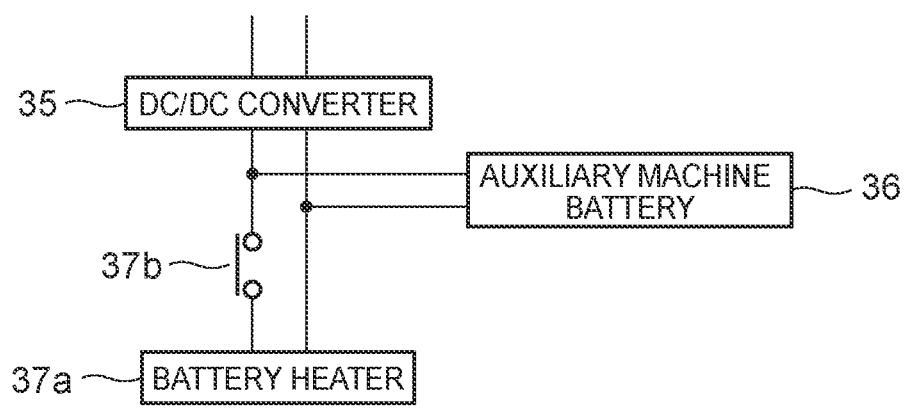
FIG. 7 is a diagram illustrating a partial configuration of a hybrid system according to a second embodiment.

FIG. 7 illustrates a partial configuration of the hybrid system. A battery heater 37a as the auxiliary machine 37 is connected to the DC/DC converter 35. The battery heater 37a generates heat when energized, and the main battery 10 is warmed up when this heat is transmitted to the main battery 10. Electric power is supplied from the DC/DC converter 35 to the battery heater 37a or electric power is supplied from the auxiliary machine battery 36 to the battery heater 37a.

A heater relay 37b is disposed in a current path that connects the DC/DC converter 35 and the auxiliary machine battery 36 to the battery heater 37a. The heater relay 37b is switched between ON and OFF in response to a control signal from the electronic control unit 50. Electric power can be supplied to the battery heater 37a when the heater relay 37b is ON. Electric power supply to the battery heater 37a can be blocked when the heater relay 37b is OFF.

Figure 8:
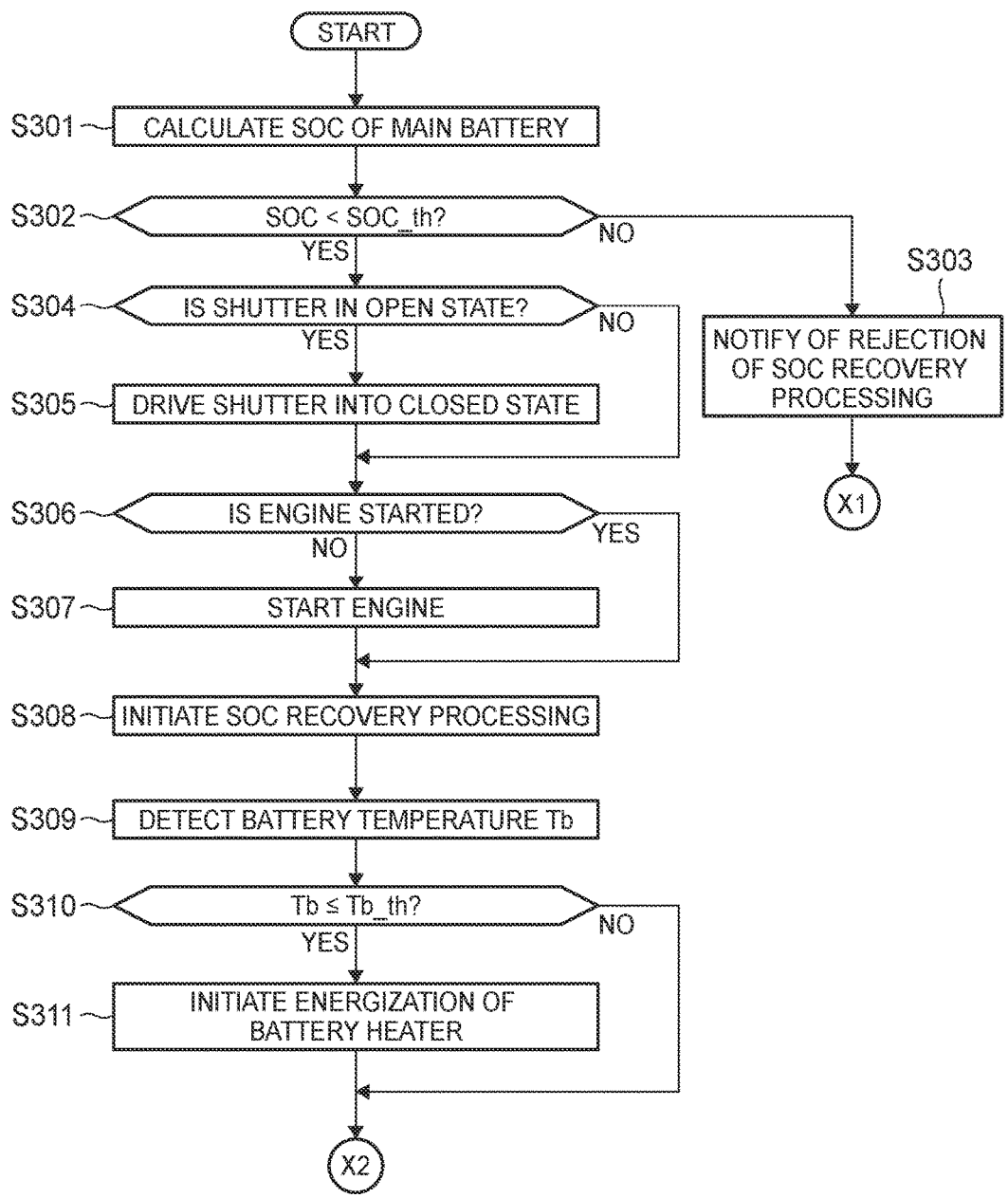
Figure 9:
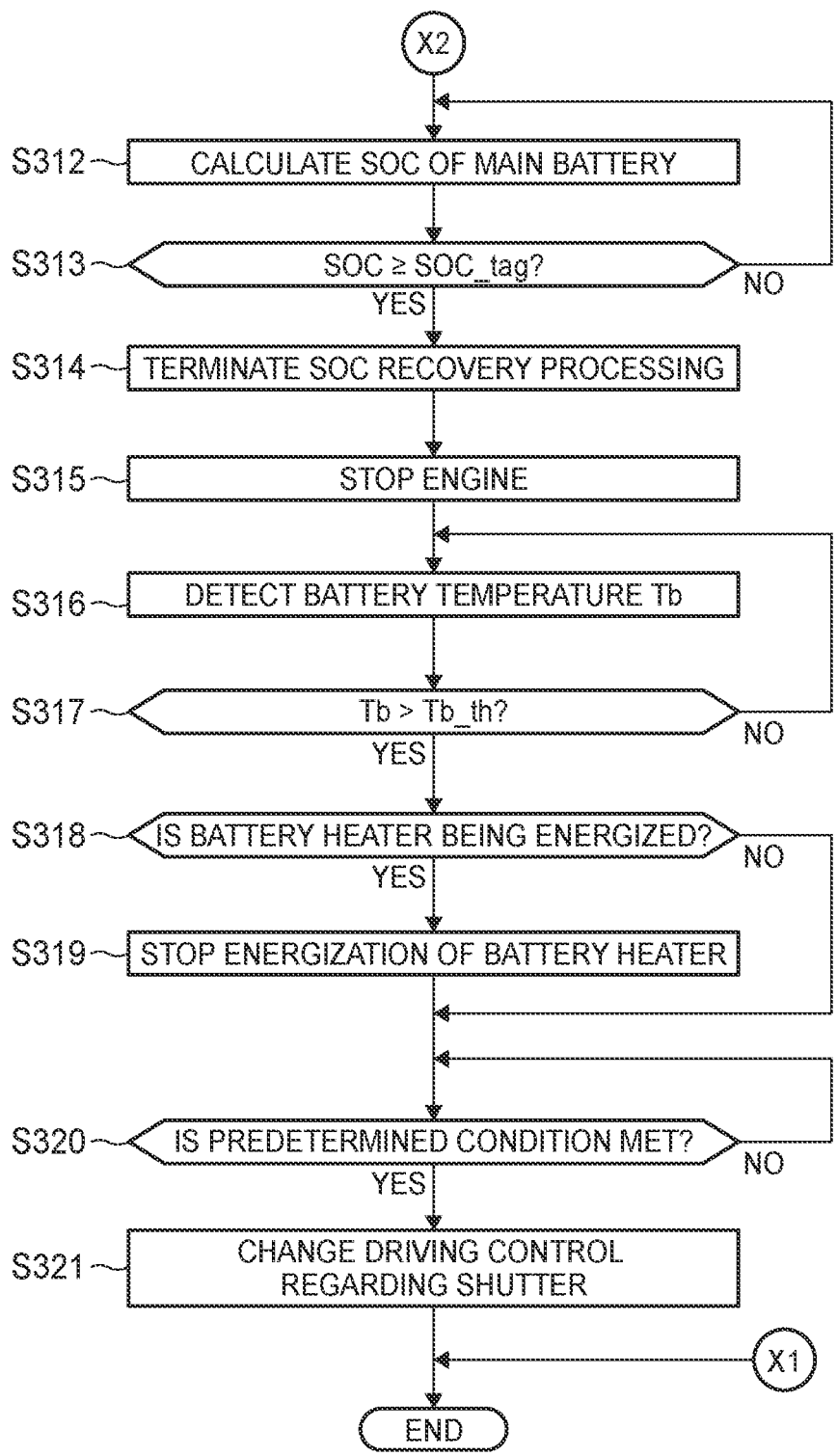

Hereinafter, processing pertaining to a case where the SOC recovery switch 70 is ON will be described based on the flowcharts that are illustrated in FIGS. 8 and 9.

The electronic control unit 50 calculates the SOC of the main battery 10 in Step S301, and determines in Step S302 whether or not the SOC of the main battery 10 is lower than the threshold SOC_th. The threshold SOC_th is the same as the threshold SOC_th described with regard to the processing of Step S205 in FIG. 6. When the SOC of the main battery 10 is equal to or higher than the threshold SOC_th, the electronic control unit 50 notifies the user of a rejection of the SOC recovery processing in Step S303. The processing of Step S303 is the same as the processing of Step S204 in FIG. 6. The electronic control unit 50 terminates the processing illustrated in FIGS. 8 and 9 after performing the processing of Step S303.

When the SOC of the main battery 10 is lower than the threshold SOC_th, the electronic control unit 50 determines in Step S304 whether or not the shutter 61 is in the open state. When the shutter 61 is in the closed state, the electronic control unit 50 proceeds to the processing of Step S306. When the shutter 61 is in the open state, the electronic control unit 50 drives the shutter 61 into the closed state in Step S305.

In Step S306, the electronic control unit 50 determines whether or not the engine 34 is started. When the engine 34 is started, the electronic control unit 50 proceeds to the processing of Step S308. When the engine 34 is not started, the electronic control unit 50 starts the engine 34 in Step S307. In Step S308, the electronic control unit 50 initiates the SOC recovery processing.

In Step S309, the electronic control unit 50 detects the battery temperature Tb by using the battery temperature sensor 23. In Step S310, the electronic control unit 50 determines whether or not the battery temperature Tb that is detected in the processing of Step S309 is equal to or lower than the predetermined temperature Tb_th. The predetermined temperature Tb_th is the same as the predetermined temperature Tb_th described with regard to the processing of Step S203 in FIG. 6.

When it is determined in Step S310 that the battery temperature Tb is higher than the predetermined temperature Tb_th, the electronic control unit 50 proceeds to the processing of Step S312. When the battery temperature Tb is equal to or lower than the predetermined temperature Tb_th, the electronic control unit 50 initiates the energization of the battery heater 37a in Step S311. Then, the main battery 10 can be warmed up based on heat generation by the battery heater 37a.

In Step S312, the electronic control unit 50 calculates the SOC of the main battery 10. In Step S313, the electronic control unit 50 determines whether or not the SOC that is calculated in the processing of Step S312 is equal to or higher than the target value SOC_tag. When the SOC of the main battery 10 is lower than the target value SOC_tag, the electronic control unit 50 returns to the processing of Step S312. In other words, the processing of Step S312 is repeated until the SOC of the main battery 10 becomes equal to or higher than the target value SOC_tag.

When the SOC of the main battery 10 is equal to or higher than the target value SOC_tag, the electronic control unit 50 terminates the SOC recovery processing in Step S314. In Step S315, the electronic control unit 50 stops the engine 34. The traveling in the CD mode is performed after the engine 34 is stopped during the traveling of the vehicle 100.

In Step S316, the electronic control unit 50 detects the battery temperature Tb by using the battery temperature sensor 23. In Step S317, the electronic control unit 50 determines whether or not the battery temperature Tb that is detected in the processing of Step S316 is higher than the predetermined temperature Tb_th.

When it is determined in the processing of Step S310 that the battery temperature Tb is equal to or lower than the predetermined temperature Tb_th, the energization of the battery heater 37a is performed in the processing of Step S311. Then, the battery temperature Tb can be raised, and the battery temperature Tb can become higher than the predetermined temperature Tb_th.

The battery heater 37a is not energized when it is determined in the processing of Step S310 that the battery temperature Tb is higher than the predetermined temperature Tb_th. When the SOC recovery processing is performed herein, the main battery 10 is allowed to generate heat based on the charging current flowing through the main battery 10. Then, the battery temperature Tb remains higher than the predetermined temperature Tb_th.

When it is determined in Step S317 that the battery temperature Tb is equal to or lower than the predetermined temperature Tb_th, the electronic control unit 50 returns to the processing of Step S316. When the battery temperature Tb is higher than the predetermined temperature Tb_th, the electronic control unit 50 determines in Step S318 whether or not the battery heater 37a is being energized. Herein, it can be determined whether or not the battery heater 37a is being energized by ON/OFF of the heater relay 37b being checked. When the battery heater 37a is not being energized, the electronic control unit 50 proceeds to the processing of Step S320. When the battery heater 37a is being energized, the electronic control unit 50 stops the energization of the battery heater 37a in Step S319. Specifically, the electronic control unit 50 switches the state of the heater relay 37b from ON to OFF.

In Step S320, the electronic control unit 50 determines whether or not a predetermined condition is met. The processing of Step S320 is the same as the processing of Step S215 in FIG. 6. The electronic control unit 50 stands by until the predetermined condition is met. In Step S321, after the predetermined condition is met, the electronic control unit 50 changes the driving control regarding the shutter 61. The processing of Step S321 is the same as the processing of Step S216 in FIG. 6.

According to this embodiment, the state of the shutter 61 is switched from the open state to the closed state when the SOC recovery processing is performed as in the case of the first embodiment. Accordingly, a reduction in the coolant temperature Tw, which rises during the SOC recovery processing, can be suppressed and the start of the engine 34 that is attributable to the coolant temperature Tw becoming lower than the start threshold Tw_th can be suppressed. The amount of the fuel that is consumed by the engine 34 can be reduced when the start of the engine 34 is suppressed.

In addition, according to this embodiment, the battery heater 37a warms up the main battery 10 and the battery temperature Tb becomes higher than the predetermined temperature Tb_th when the battery temperature Tb is equal to or lower than the predetermined temperature Tb_th while the SOC recovery processing is performed. Accordingly, a reduction in the input and output performances of the main battery 10 can be suppressed when the traveling in the CD mode is performed with the SOC recovery processing terminated. In other words, the required output of the vehicle 100 becomes likely to be met by the use of the output of the main battery 10 alone, and the traveling in the CD mode can continue.

In FIG. 8, the processing of Step S301 to Step S303 can be omitted. In other words, the processing that follows Step S204 can be performed when the SOC recovery switch 70 is ON.

What is claimed is:

1. A vehicle comprising:
    an engine configured to generate power for the vehicle;
    a generator configured to generate electric power by receiving an output of the engine;
    an electric power storage device configured to perform charging and discharging and generate power for the vehicle;
    a switch configured to be operated by a user;
    an engine compartment accommodating the engine;
    a shutter arranged in a path of air, the air being let into the engine compartment from an outside of the vehicle, the shutter being configured to switch between a closed state where the path of air is closed and an open state where the path of air is open; and
    an electronic control unit configured to:
    i) control driving of the shutter,
    ii) charge the electric power storage device by using the electric power generated by the generator when the switch is operated, and iii) close the shutter when the electric power storage device is charged based on the operation of the switch.

2. The vehicle according to claim 1, further comprising:
a heater configured to warm up the electric power storage device; and
a temperature sensor configured to detect a temperature of the electric power storage device,
wherein the electronic control unit is configured to drive the heater when the temperature of the electric power storage device is equal to or lower than a predetermined temperature when the electric power storage device is charged based on the operation of the switch.

3. A vehicle comprising:
an engine configured to generate power for the vehicle;
a generator configured to generate electric power by receiving an output of the engine;
an electric power storage device configured to perform charging and discharging and generate power for the vehicle;
a switch configured to be operated by a user;
an engine compartment accommodating the engine;
a shutter arranged in a path of air, the air being let into the engine compartment from an outside of the vehicle, the shutter being configured to switch between a closed state where the path of air is closed and an open state where the path of air is open; and
an electronic control unit configured to:
i) control driving of the shutter,
ii) charge the electric power storage device by using the electric power generated by the generator when the switch is operated, and
iii) close the shutter from termination of the charging of the electric power storage device resulting from the operation of the switch to satisfaction of a predetermined condition.

4. The vehicle according to claim 3, further comprising:
a heater configured to warm up the electric power storage device; and
a temperature sensor configured to detect a temperature of the electric power storage device,
wherein the electronic control unit is configured to drive the heater when the temperature of the electric power storage device is equal to or lower than a predetermined temperature when the electric power storage device is charged based on the operation of the switch.

5. A control method for a vehicle including
an engine configured to generate power for the vehicle,
a generator configured to generate electric power by receiving an output of the engine,
an electric power storage device configured to perform charging and discharging and generate power for the vehicle,
an engine compartment accommodating the engine,
a shutter arranged in a path of air,
the air being let into the engine compartment from an outside of the vehicle,
the shutter being configured to switch between a closed state where the path of air is closed and an open state where the path of air is open, and
an electronic control unit,
the control method comprising:
charging, by the electronic control unit, the electric power storage device by using the electric power generated by the generator when a state of charge of the electric power storage device is equal to or lower than a predetermined value; and
closing, by the electronic control unit, the shutter from termination of the charging of the electric power storage device to satisfaction of a predetermined condition.

6. A vehicle comprising:
an engine configured to generate power for the vehicle;
a generator configured to generate electric power by receiving an output of the engine;
an electric power storage device configured to perform charging and discharging and generate power for the vehicle;
an engine compartment accommodating the engine;
a shutter arranged in a path of air, the air being let into the engine compartment from an outside of the vehicle, the shutter being configured to switch between a closed state where the path of air is closed and an open state where the path of air is open; and
an electronic control unit configured to:
i) control driving of the shutter,
ii) charge the electric power storage device by using the electric power generated by the generator when a state of charge of the electric power storage device is equal to or lower than a predetermined value, and
iii) close the shutter when the electric power storage device is charged.

7. A vehicle comprising:
an engine configured to generate power for the vehicle;
a generator configured to generate electric power by receiving an output of the engine;
an electric power storage device configured to perform charging and discharging and generate power for the vehicle;
an engine compartment accommodating the engine;
a shutter arranged in a path of air, the air being let into the engine compartment from an outside of the vehicle, the shutter being configured to switch between a closed state where the path of air is closed and an open state where the path of air is open; and
a electronic control unit configured to:
i) control driving of the shutter,
ii) charge the electric power storage device by using the electric power generated by the generator when a state of charge of the electric power storage device is equal to or lower than a predetermined value, and
iii) close the shutter from termination of the charging of the electric power storage device to satisfaction of a predetermined condition.

* * * * *